(12) United States Patent
Grondin et al.

(10) Patent No.: US 12,227,319 B1
(45) Date of Patent: Feb. 18, 2025

(54) LAUNCHER FOR UNMANNED AERIAL VEHICLES (UAVs)

(71) Applicant: United States of America as represented by the Secretary of the Navy, Arlington, VA (US)

(72) Inventors: Timothy Grondin, Panama City, FL (US); Andrew Schicho, Panama City, FL (US); Patrick Delay, Panama City, FL (US); Halie Cameron, Panama City, FL (US)

( * ) Notice: Subject to any disclaimer, the term of this patent is extended or adjusted under 35 U.S.C. 154(b) by 107 days.

(21) Appl. No.: 18/133,077

(22) Filed: Apr. 11, 2023

(51) Int. Cl.
*B64U 80/10* (2023.01)
*B64U 70/70* (2023.01)
*B64U 80/40* (2023.01)
*B64U 80/70* (2023.01)

(52) U.S. Cl.
CPC ............ *B64U 80/10* (2023.01); *B64U 70/70* (2023.01); *B64U 80/40* (2023.01); *B64U 80/70* (2023.01)

(58) Field of Classification Search
CPC ........ B64U 70/70; B64U 80/10; B64U 80/40; B64U 70/20; B64F 1/06; B64F 1/22; B64F 1/222; B65D 83/0409; G07F 11/24; B64D 1/06; B64D 1/12; B64D 5/00
See application file for complete search history.

(56) References Cited

U.S. PATENT DOCUMENTS

| | | | | | |
|---|---|---|---|---|---|
| 1,063,387 | A | * | 6/1913 | RIcker et al. | G07F 11/24 221/277 |
| 2,583,217 | A | * | 1/1952 | James | G07F 11/24 221/250 |
| 3,021,759 | A | * | 2/1962 | Somerville | B64D 1/06 89/1.51 |
| 3,520,502 | A | * | 7/1970 | Smethers, Jr. | B64D 5/00 104/103 |
| 4,530,476 | A | * | 7/1985 | Thurber, Jr. | B64U 30/12 89/1.801 |
| 4,542,834 | A | * | 9/1985 | Kurosawa | G07F 11/163 221/116 |
| 9,611,044 | B2 | * | 4/2017 | Hiisilä | F41B 7/00 |
| 10,179,648 | B2 | * | 1/2019 | Chin | B64D 5/00 |
| 10,518,903 | B2 | * | 12/2019 | Sirvis | B64F 1/06 |
| 11,143,481 | B2 | * | 10/2021 | Bies | B64D 1/04 |

(Continued)

FOREIGN PATENT DOCUMENTS

| | | | | |
|---|---|---|---|---|
| CN | 112173153 | A | * | 1/2021 |
| EP | 0141672 | A1 | * | 5/1985 |

(Continued)

*Primary Examiner* — Joseph W Sanderson
(74) *Attorney, Agent, or Firm* — James T. Shepherd (57) ABSTRACT

A launcher device includes a hopper having an open end disposed beneath a stack of UAVs. A retainer retains the UAVs in the hopper and releases one of the UAVs at the hopper's open end. A movable carriage disposed beneath the retainer receives the released UAV. The carriage is operable to be moved along a first direction from beneath the retainer to a terminus and subsequently operable to be moved along a second direction from the terminus to beneath the retainer. When moved in the first direction when the released UAV is on the carriage, the carriage moves the released UAV in the first direction to the terminus. A ramp aligned with the carriage guides the carriage along the ramp as the carriage is moved along the first and second directions.

8 Claims, 7 Drawing Sheets

(56) References Cited

U.S. PATENT DOCUMENTS

| | | | | |
|---|---|---|---|---|
| 11,628,952 | B1* | 4/2023 | Wright | B64U 70/70 |
| | | | | 244/63 |
| 11,787,561 | B2* | 10/2023 | Brown | B64F 1/06 |
| | | | | 244/63 |
| 11,898,368 | B2* | 2/2024 | Blake | B64U 80/25 |
| 2003/0116677 | A1* | 6/2003 | Young | A63H 27/14 |
| | | | | 244/63 |
| 2008/0179342 | A1* | 7/2008 | Woods | G07F 11/24 |
| | | | | 221/217 |
| 2012/0080556 | A1* | 4/2012 | Root, Jr. | B64F 1/06 |
| | | | | 73/170.28 |
| 2016/0332738 | A1* | 11/2016 | Hiisila | B64D 17/70 |
| 2016/0355261 | A1* | 12/2016 | Chin | B64U 70/20 |
| 2017/0313442 | A1* | 11/2017 | Sirvis | B64F 1/06 |
| 2019/0383052 | A1* | 12/2019 | Blake | B60L 53/30 |
| 2020/0363155 | A1* | 11/2020 | Bies | B64D 7/08 |
| 2022/0332434 | A1* | 10/2022 | Brown | B64U 70/70 |
| 2023/0159192 | A1* | 5/2023 | Gil | B64U 80/25 |
| | | | | 244/137.1 |
| 2024/0124169 | A1* | 4/2024 | Song | B64U 80/25 |

FOREIGN PATENT DOCUMENTS

| | | | | |
|---|---|---|---|---|
| GB | 2200620 | A | * | 8/1988 |
| JP | H05342466 | A | * | 12/1993 |
| KR | 102227994 | B1 | * | 3/2021 |
| WO | WO-2020249867 | A1 | * | 12/2020 |

* cited by examiner

LAUNCHER FOR UNMANNED AERIAL VEHICLES (UAVs)

ORIGIN OF THE INVENTION

The invention described herein may be manufactured and used by or for the Government of the United States of America for Governmental purposes without payment of any royalties.

FIELD OF THE INVENTION

The invention relates generally to the launching of unmanned aerial vehicles (UAVs), and more particularly to a device for launching winged UAVs in a successive and repeatable fashion.

BACKGROUND OF THE INVENTION

Current methods of launching UAVs are only capable of launching a single UAV at a time. For example, small UAVs may be launched by hand by an individual. Larger UAVs may utilize launch devices that are spring, pneumatic, or band-propelled rail systems that must be manually reset and reloaded with a new UAV after each launch. As UAV technology has matured and the strategic use of swarming sets of UAVs has become more prevalent, there is a need to launch multiple UAVs in quick succession.

SUMMARY OF THE INVENTION

Accordingly, it is an object of the present invention to provide a launcher for unmanned aerial vehicles (UAVs).

Another object of the present invention is to provide a device for the successive and repeated launching of winged UAVs.

Other objects and advantages of the present invention will become more obvious hereinafter in the specification and drawings.

In accordance with the present invention, a UAV launcher device includes a hopper that is adapted to hold a stack of unmanned aerial vehicles (UAVs). The hopper has an open end disposed beneath the stack. A retainer is coupled to the hopper and is disposed adjacent to its open end. The retainer is operable to retain the UAVs in the hopper and to release one of the UAVs at the open end of the hopper wherein a released UAV of the UAVs exits the hopper at the open end. A movable carriage is disposed beneath the retainer wherein the released UAV is deposited on the carriage after exiting the hopper. The carriage is operable to be moved along a first direction from beneath the retainer to a terminus and subsequently operable to be moved along a second direction from the terminus to beneath the retainer. When moved in the first direction when the released UAV is on the carriage, the carriage moves the released UAV in the first direction to the terminus. A ramp aligned with the carriage guides the carriage along the ramp as the carriage is moved along the first direction and second direction.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
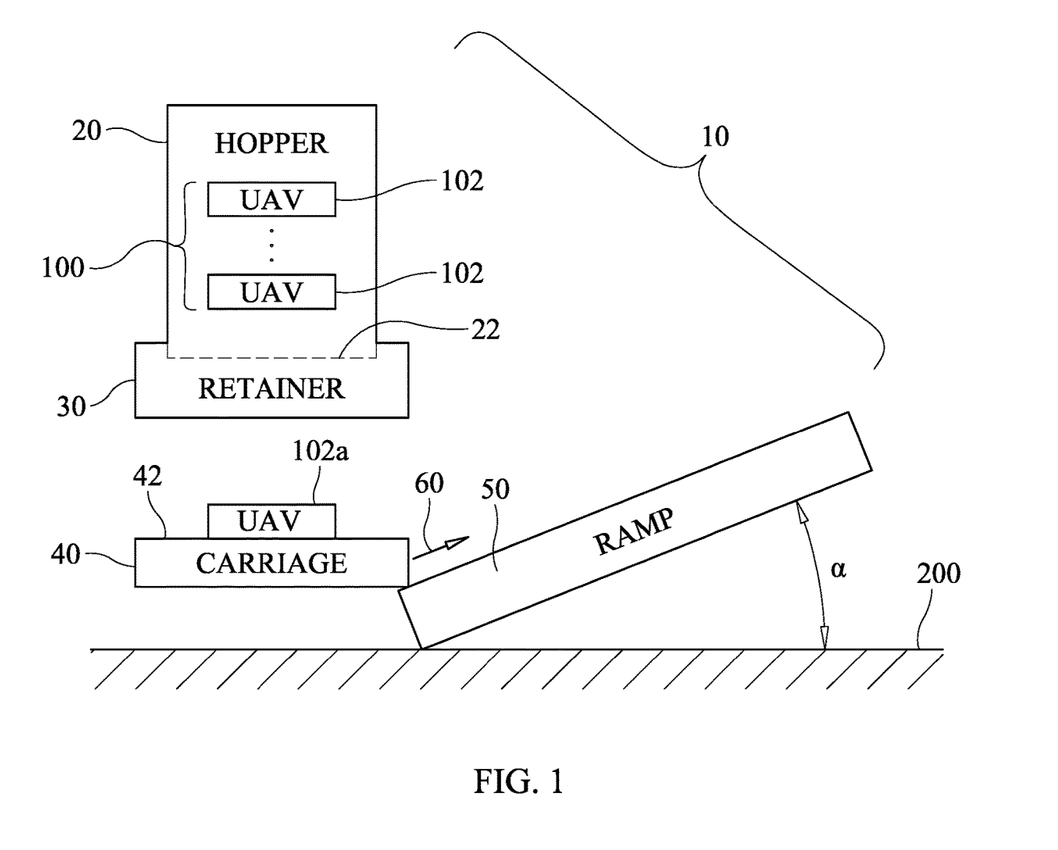
FIG. 1 is a schematic view of a launcher for multiple unmanned aerial vehicles (UAVs) illustrated prior to the launch of one UAV in accordance with an embodiment of the present invention.

Referring now to the drawings and more particularly to FIG. 1, a schematic view of a launcher for multiple unmanned aerial vehicles (UAVs) is shown and is referenced generally by numeral 10. Launcher 10 can be adapted for use with a variety of configurations of UAVs. For example and as will be explained further below, launcher 10 can be used for the launching of winged UAVs such as those having a fuselage, a pair of wings extending outward from the fuselage, and stabilizers extending outward from the fuselage and positioned aft of the wings.

In general, launcher 10 includes a hopper 20 that holds a stack 100 of UAVs 102, a retainer 30 for keeping UAVs 102 in hopper 20 until such time that one of the UAVs is to be released from hopper 20, and a movable carriage 40 for transporting one UAV 102*a* (released from hopper 20) along a ramp 50 in order to launch the released UAV 102*a* from carriage 40. In the illustrated example, ramp 50 is disposed at an acute angle of inclination a relative to a surface 200 on which launcher 10 is deployed. For example, surface 200 may be a ground surface, the surface of a man-made structure, a surface onboard a moving or movable vehicle/vessel, etc. In general, ramp 50 is set to provide a desired angle-of-attack for the particular UAV 102*a* that is to be launched. In some embodiments, the angle-of-attack provided by ramp 50 is set relative to the sky's horizon. Ramp 50 is aligned with carriage 40 and serves to guide the carriage as it moves along ramp 50 as will be described further below.

Hopper 20 includes an open end 22 aligned gravitationally beneath the lowermost UAV 102 from the stack 100 of UAVs 102 and over carriage 40 in its pre-launch position illustrated in FIG. 1. That is, prior to launch, carriage 40 is disposed gravitationally beneath retainer 30 so that the released UAV 102*a* is able to fall under the force of gravity and come to rest on carriage 40. Hopper 20 may be configured in a variety of ways to utilize the force of gravity (e.g., as a vertical structure, a structure disposed at a non-vertical angle, a curved structure, etc.) to allow a lowermost one of UAVs 102 in the stack 100 to fall through open end 22 (to become released UAV 102*a*) as controlled by retainer 30. In some embodiments, spacers (not shown) may be used between UAVs 102 in the stack 100 where such spacers are designed to yield or fall away as the lowermost one of UAVs 102 is released by retainer 30. A top surface 42 of carriage 40 on which the released UAV 102*a* rests may be cushioned or may have a cushion disposed on it in order to protect the released UAV 102*a* as it falls through the hopper's open end 22 and onto carriage 40. In some embodiments, carriage 40 may be configured to position/cradle the released UAV 102*a* into a desired pre-launch and launch position. In some embodiments, additional positioners (not shown) may be provided to assist in the proper positioning of the released UAV 102*a* on carriage 40.

Figure 2:
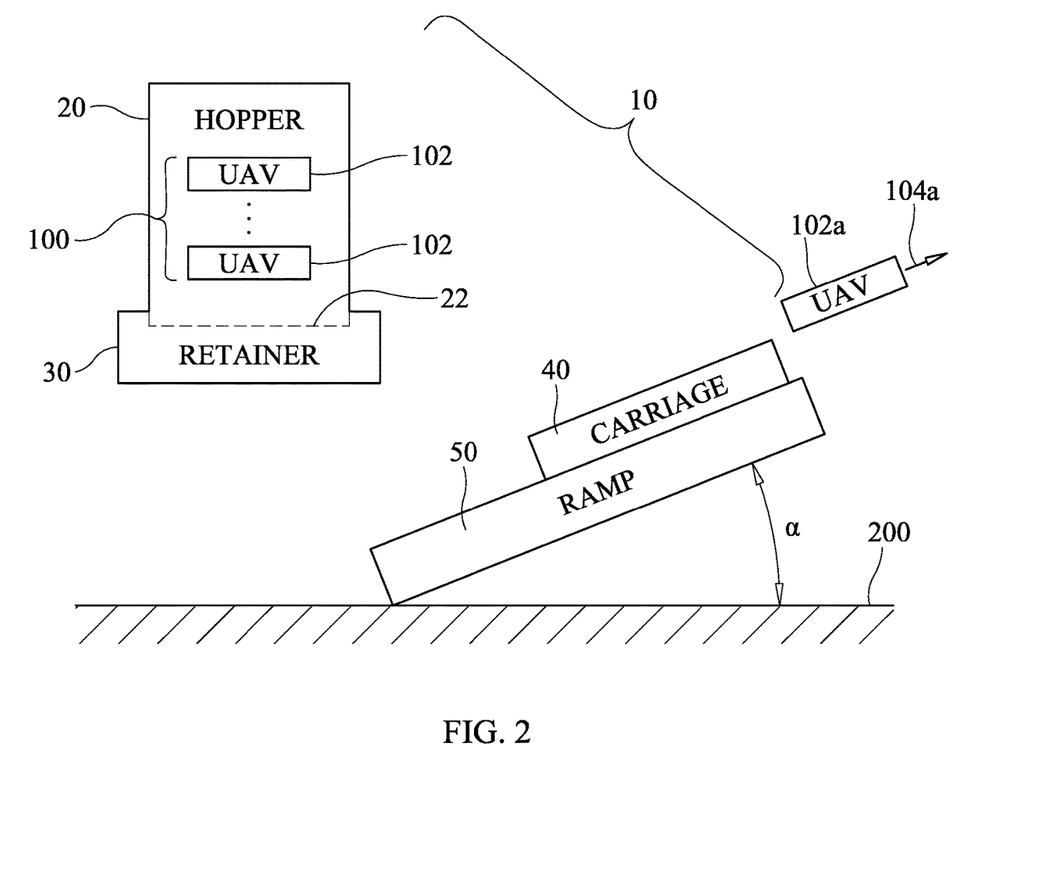
FIG. 2 is a schematic view of the launcher of FIG. 1 as the one UAV is being launched.
Figure 3:
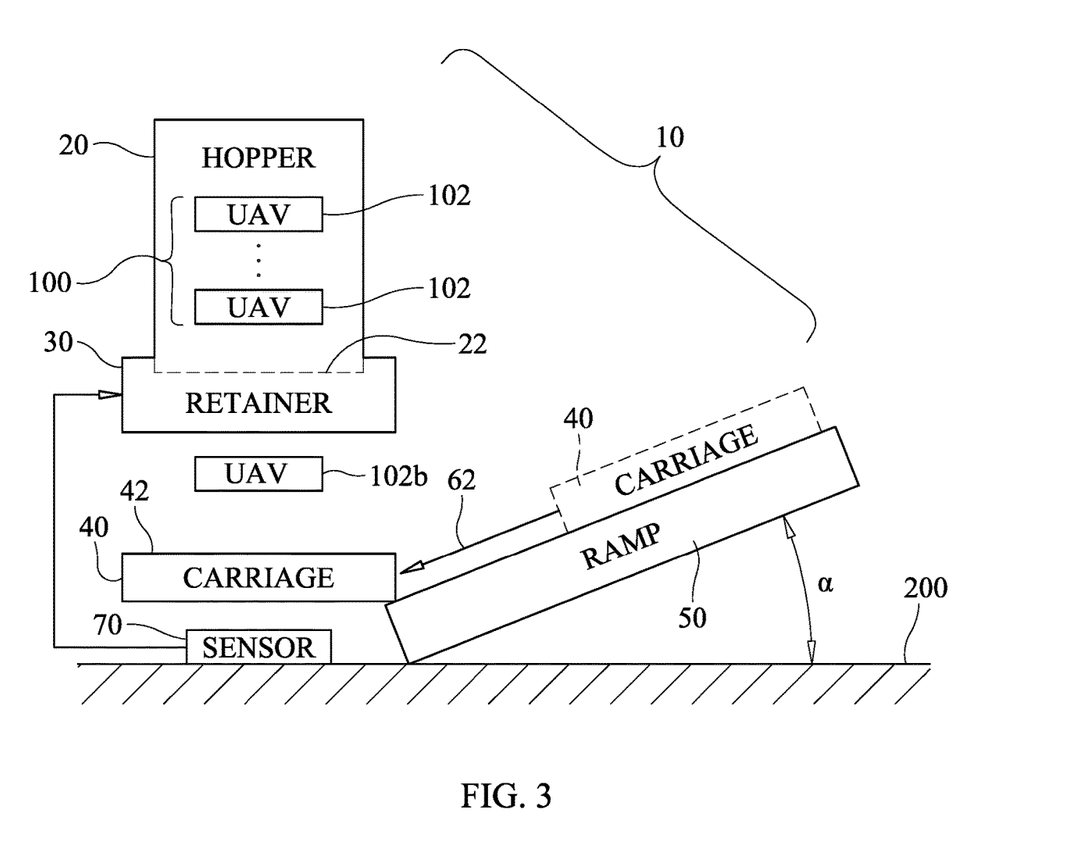
FIG. 3 is a schematic view of the launcher of FIG. 1 with its carriage returned to its pre-launch position after the one UAV has been launched.

Referring additionally and simultaneously to FIGS. 2 and 3, launcher 10 is illustrated in FIG. 2 as it would be configured when the released UAV 102*a* is launched from carriage 40, and is illustrated in FIG. 3 as it would be configured post-launch when carriage 40 has returned to its pre-launch position where it is poised to receive the next released UAV 102*b*. Beginning at the pre-launch position of carriage 40 with its supported released UAV 102*a* beneath retainer 30 as shown in FIG. 1, a motive force is applied to carriage 40 to move carriage 40 along a first direction 60 as guided by ramp 50. Carriage 40 along with its supported UAV 102*a* is moved along ramp 50 in first direction 60 until carriage 40 reaches a terminus on ramp 50 as illustrated in FIG. 2. For example, in the illustrated embodiment, movement of carriage 40 along first direction 60 terminates at or near the end of ramp 50. At this point, UAV 102*a* launches from carriage 40 using its self-contained propulsion system (not shown) such that UAV 102*a* commences its flight as indicated by arrow 104*a*. Following the launch of UAV 102*a*, carriage 40 is moved from its terminus on ramp 50 (i.e., at the position shown in FIG. 2) along ramp 50 in a second direction 62 (i.e., opposite first direction 60) until carriage 40 reaches its pre-launch position beneath retainer 30 as illustrated in FIG. 3. Once carriage 40 is again positioned beneath retainer 30, retainer 30 is operated to release the next UAV 102*b* from the stack 100 through open end 22 of hopper 20. In some embodiments, a sensor 70 may be provided to detect the return of carriage 40 to its pre-launch position as illustrated in FIG. 3. In such cases, the output of sensor 70 may be provided to retainer 30 to control the retainer's operation to thereby automatically release the next UAV 102*b*.

As mentioned above, the UAVs launched by the above-described launcher may be UAVs having wings and stabilizers. For such applications, the above-described carriage 40 may be outfitted with arms that engage the wings of the UAV as the UAV is moved along ramp 50 for a launch, but then are movable to avoid damaging the aft-mounted stabilizers as the UAV launches from the carriage. In an exemplary embodiment illustrated in FIG. 4, a stack of winged UAVs 110 is disposed in hopper 20. Each winged UAV 110 has a fuselage 112, a pair of wings 114 (only one is visible in FIG. 4), and a pair of stabilizers 116 (only one is visible in FIG. 4). Such winged UAVs 110 are well-known in the art. One winged UAV 110*a* released by retainer 30 from hopper 20 is disposed on carriage 40. When positioned on carriage 40, a first gap 80 is defined between the top surface 42 of carriage 40 and each of wings 114*a* and a second gap 82 is defined between the top surface 42 of carriage 40 and each of stabilizers 116*a*. Gaps 80 and 82 may be the same or different without departing from the scope of the present invention.

Figure 4:
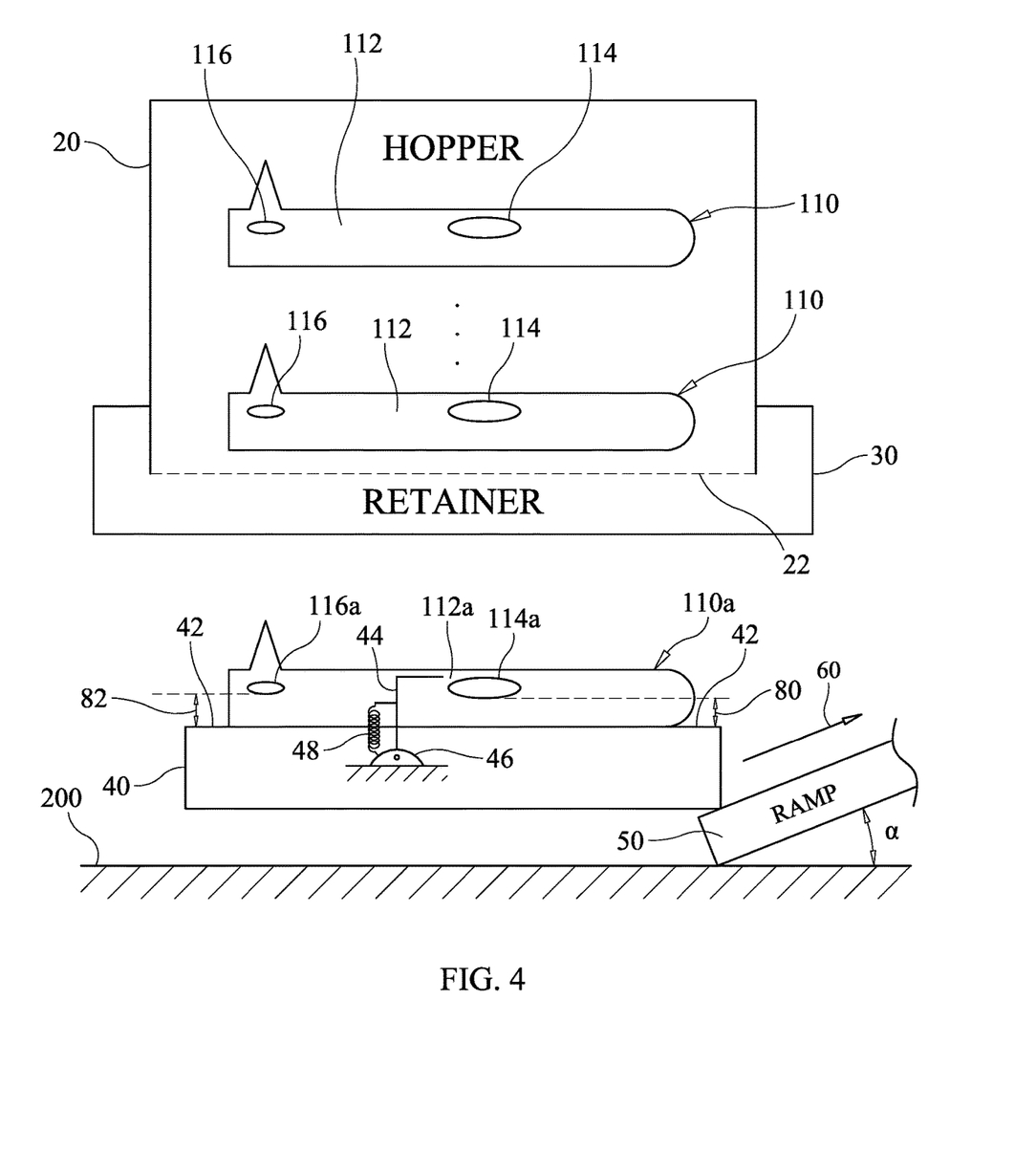
FIG. 4 is a side schematic view of the launcher's carriage with a spring-loaded arm mounted on the carriage and positioned for engagement with one wing of a UAV's pair of wings in accordance with an embodiment of the present invention.

Coupled to carriage 40 is arm 44 configured to span gap 80 so that arm 44 engages an aft region of wing 114*a* as carriage 40 begins to move along first direction 60 towards the carriage's terminus on ramp 50 (illustrated in FIG. 2). Although not visible, it is to be understood that a second arm (i.e., identical to arm 44) is provided on the other side of carriage 40 for engagement of the other wing (i.e., identical to wing 114*a*) on the other side of fuselage 112*a*. In the illustrated embodiment, each arm 44 is coupled to carriage 40 by a corresponding hinge 46 configured to position arm 44 such that it spans gap 80 in a pre-launch and launch position where it will engage wing 114*a* as carriage 40 moves in first direction 60. Arm 44 is biased to this pre-launch and launch position by a spring 48 coupled to arm 44 and hinge 46. It is to be understood that the combination of arm 44, hinge 46, and spring 48 may be configured in a variety of ways without departing from the scope of the present invention. As carriage 40 is moved along first direction 60, each of arms 44 engages an aft region of their respective wing 114*a* as carriage 40 moves up ramp 50.

Figure 5:
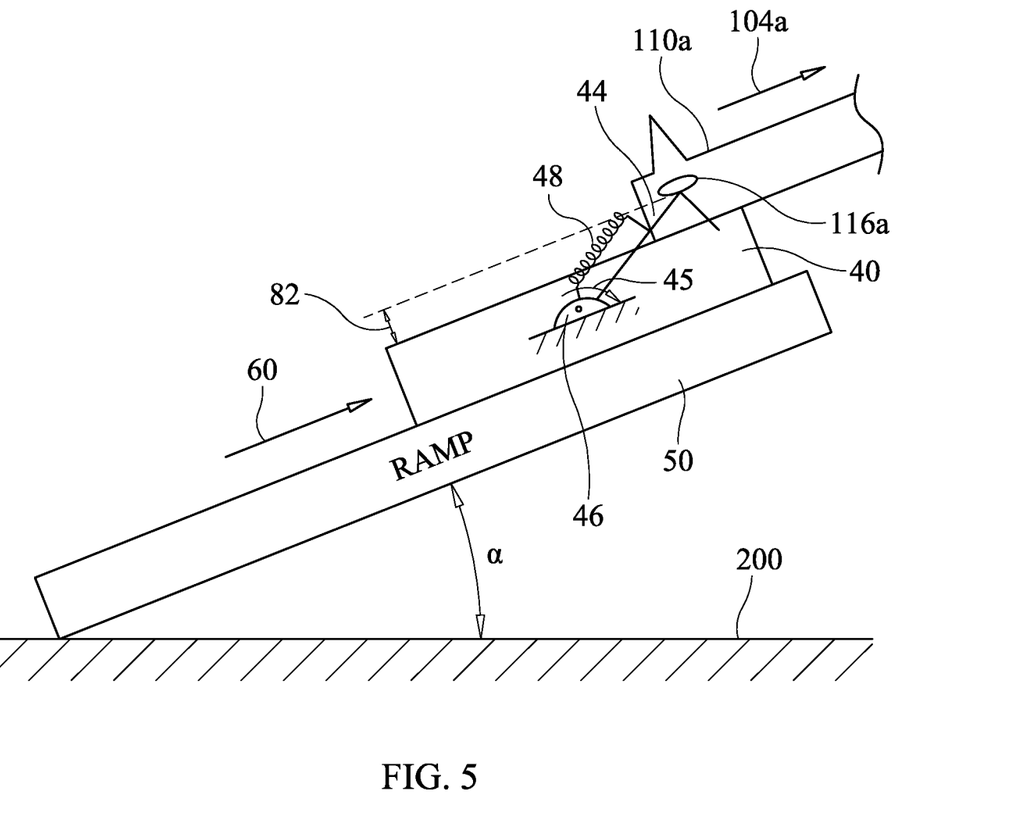
FIG. 5 is a side schematic view of the launcher's carriage with the spring-loaded arm rotated by the stabilizers of the winged UAV following its launch in accordance with an embodiment of the present invention.

Referring additionally now to FIG. 5 where carriage 40 has reached its terminus on ramp 50, UAV 110*a* is illustrated as it is being launched from carriage 40 to commence its flight 104*a* under its own power. As each stabilizer 116*a* engages a respective arm 44, its hinge 46 supports rotation of arm 44 (as indicated by rotation arrow 45) in a direction initially aligned with first direction 60 as arm 44 rotates down towards carriage 40 until arm 44 is positioned in gap 82 thereby allowing stabilizer 116*a* to pass there over as UAV 110*a* begins its flight 104*a*. Once each stabilizer 116*a* clears its respective arm 44, each arm's corresponding hinge 46 and spring 48 support movement of the arm back to its pre-launch and launch position illustrated in FIG. 4.

Figure 6:
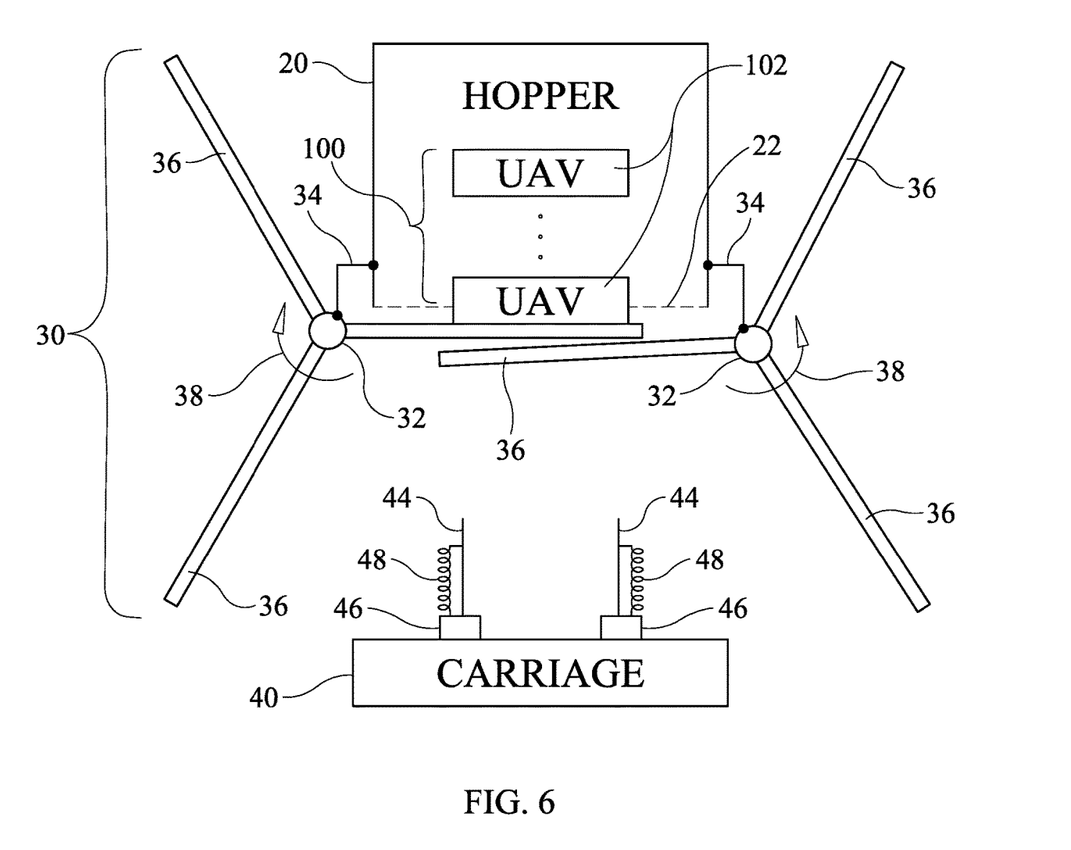
FIG. 6 is an end view of the launcher's hopper with two spoked hubs serving as the launcher's retainer in accordance with an embodiment of the present invention.

Referring now to FIG. 6, an end view of a launcher's hopper 20 is illustrated with an embodiment of a retainer 30 coupled thereto. Carriage 40 with its above-described arms 44, hinge 46, and spring 48 is also illustrated beneath retainer 30. In the illustrated example, retainer 30 includes two rotatable hubs 32 disposed on opposing sides of hopper 20 at its open end 22. Hubs 32 may be coupled to hopper 20 by brackets 34. Each hub 32 has a set of spokes 36 extending radially out from their respective hub 32. Each spoke 36 is long enough to span at least a portion of the hopper's open end 22 to thereby support/retain the lowermost UAV 102 in the stack 100. In one embodiment, the spokes of each hub are in a common plane and mesh with the spokes of the other hub, as illustrated in FIG. 6. In the illustrated example, each hub has three spokes 36 spaced apart from one another by an angle of 120°. When it is time to release the lowermost UAV 102 from vertical stack 100 onto carriage 40, hubs 32 are rotated towards one another in opposing directions as indicated by rotation arrows 38. A rotation 38 of less than one revolution (e.g., 120° in the illustrated example) will allow the lowermost UAV 102 to be released through open end 22 while retaining the remainder of UAVs 102 in the vertical stack 100. Rotation 38 may be controlled by motors (not shown) actuated automatically when carriage 40 is positioned post-launch beneath retainer 30 as described previously herein.

The motive force used to move the above-described carriage 40 along ramp 50 as described herein may be supplied in a variety of ways. For example, in one exemplary embodiment illustrated in FIG. 7, a launcher 300 includes a base 310 disposed on a ground surface 200. A hopper 320 holding a stack 100 of UAVs 102 is coupled to base 310, for example, by one or more brackets 312. Hopper 320 includes an open end 322 aligned under the stack 100 of UAVs 102.

Figure 7:
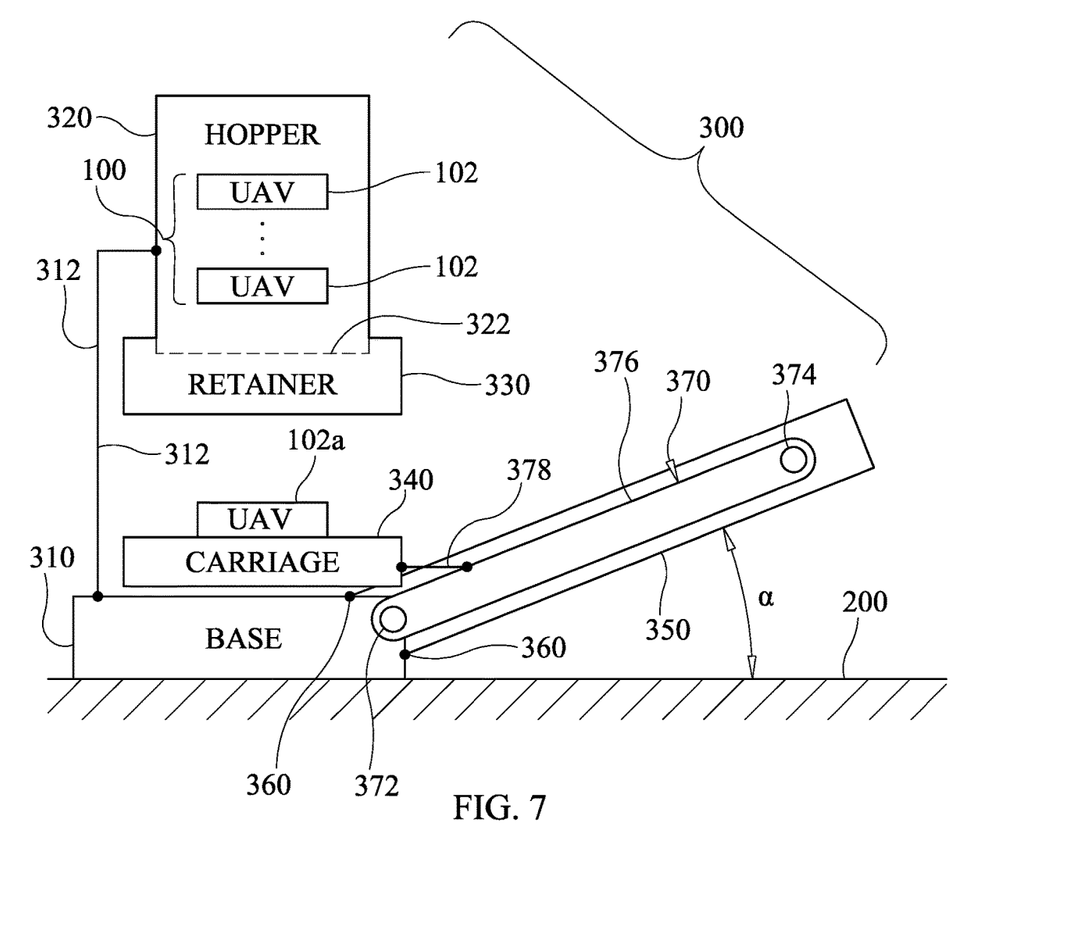
FIG. 7 is a schematic view of a launcher for multiple UAVs illustrated prior to the launch of one UAV in accordance with another embodiment of the present invention.

A retainer 330 disposed at open end 322 serves to retain UAVs 102 in their stack 100 and release the lowermost UAV 102 for deposition onto a carriage 340 as described previously herein. A ramp 350 is hingedly coupled to base 310 at, for example, hinge points 360 such that the ramp's angle of inclination a relative to ground surface 200 may be set for a particular launch application. A belt drive 370 is coupled to base 310 and ramp 350 to provide the motive force needed to move carriage 340 up ramp 350 during a UAV launch and then back down ramp 350 to return carriage 340 to its pre-launch position as described previously herein. Briefly, belt drive 370 includes a drive wheel 372 coupled to base 310, a drive wheel 374 coupled to ramp 350, and an endless belt 376 engaging drive wheels 372 and 374. Carriage 340 is coupled to belt 376 by the connection indicated by numeral 378. By way of an example, drive wheel 374 may be powered/driven to move carriage 340 up ramp 350 during a launch and drive wheel 372 may be powered/driven to move carriage 340 down ramp 350 following a launch. It is to be understood that the particular configuration of belt drive 370 and its relationship to base 310 and ramp 350 can be other than shown without departing from the scope of the present invention.

The advantages of the present invention are numerous. UAVs may be launched in a successive and repeatable fashion to ensure success at the outset of each UAV's mission. The launcher may be configured to operate with a variety of types of UAVs to include winged UAVs having rear stabilizers.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

The invention claimed is:

1. A device, comprising
   a hopper adapted to hold a stack of unmanned aerial vehicles (UAVs), said hopper having an open end disposed beneath the stack;
   a retainer coupled to said hopper and disposed adjacent to said open end, said retainer operable to retain the UAVs in said hopper and to release one of the UAVs at said open end of said hopper, wherein a released UAV of the UAVs exits said hopper at said open end;
   a movable carriage disposed beneath said retainer, wherein the released UAV is deposited on said carriage after exiting said hopper, said carriage operable to be moved along a first direction from beneath said retainer to a terminus and subsequently operable to be moved along a second direction from said terminus to beneath said retainer wherein, when moved in said first direction when the released UAV is on said carriage, said carriage moves the released UAV in said first direction to said terminus; and
   a ramp aligned with said carriage, said ramp operable to guide said carriage along said ramp as said carriage is moved along said first direction and said second direction;
   wherein said retainer comprises
      a first hub disposed on a first side of said hopper at said open end;
      a second hub disposed on a second side of said hopper at said open end;
      a first set of radially-extending spokes coupled to said first hub;
      a second set of radially-extending spokes coupled to said second hub, wherein said spokes from said first set are in a common plane with said spokes from said second set, and wherein said spokes from said first set mesh with said spokes from said second set; and
   wherein said first hub and said second hub are operable to rotate in opposite directions and through less than one revolution each time said retainer is to release one of the UAVs at said open end.

2. The device of claim 1, further comprising a cushion disposed on said carriage, said cushion configured to receive and support the released UAV.

3. The device of claim 1, wherein the released UAV includes a pair of wings, the device further comprising:
   a pair of arms coupled to said carriage, each of said arms adapted to engage one wing of the pair of wings when said carriage moves in said first direction.

4. The device of claim 3, wherein the released UAV includes stabilizers aft of the pair of wings, each of said arms being hingedly coupled to said carriage and operable to rotate in said first direction and towards said ramp when said carriage is at said terminus after being moved in said first direction.

5. A device, comprising
   a base adapted to be disposed on a surface;
   a hopper coupled to said base and adapted to hold a stack of unmanned aerial vehicles (UAVs), said hopper having an open end disposed gravitationally beneath the stack;
   a retainer coupled to said hopper and disposed adjacent to said open end, said retainer operable to retain the UAVs in said hopper and to release a single one of the UAVs via said open end of said hopper, wherein a released UAV of the UAVs exits said hopper at said open end;
   a ramp coupled to said base and disposed at an angle-of-attack required for launching the released UAV;
   a belt drive coupled to said base and to said ramp; and
   a carriage coupled to said belt drive and disposed at a position beneath said retainer wherein the released UAV is deposited on said carriage after exiting said hopper,
   said belt drive operable to move said carriage along a first direction wherein said carriage is moved from said position beneath said retainer to a terminus on said ramp, and said belt drive operable to subsequently move said carriage along a second direction wherein said carriage is moved from said terminus to said position beneath said retainer,
   wherein, when said carriage is moved in said first direction when the released UAV is on said carriage, said carriage moves the released UAV in said first direction to said terminus on said ramp,
   wherein said retainer comprises
      a first hub disposed on a first side of said hopper at said open end;
      a second hub disposed on a second side of said hopper at said open end;
      a first set of radially-extending spokes coupled to said first hub;
      a second set of radially-extending spokes coupled to said second hub, wherein said spokes from said first set are in a common plane with said spokes from said second set, and wherein said spokes from said first set mesh with said spokes from said second set; and said first hub and said second hub operable to rotate in opposite directions and through less than one revolution each time said carriage is moved along said second direction to said position beneath said retainer.

6. The device of claim 5, further comprising:
a cushion disposed on said carriage, said cushion configured to receive and support the released UAV.

7. The device of claim 5, wherein said ramp is hingedly coupled to said base.

8. The device of claim 5, wherein the released UAV includes a pair of wings, the device further comprising:
a pair of arms coupled to said carriage, each of said arms adapted to engage one wing of the pair of wings when said carriage moves in said first direction.

* * * * *